(12) United States Patent
Singh et al.

(10) Patent No.: US 10,119,812 B2
(45) Date of Patent: Nov. 6, 2018

(54) TRAILER PARAMETER IDENTIFICATION SYSTEM

(71) Applicant: Jaguar Land Rover Limited, Coventry (GB)

(72) Inventors: Harpreet Singh, Coventry (GB); Andrew Bradley, Coventry (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 0 days.

(21) Appl. No.: 14/900,778

(22) PCT Filed: Jul. 3, 2014

(86) PCT No.: PCT/EP2014/064268
§ 371 (c)(1),
(2) Date: Dec. 22, 2015

(87) PCT Pub. No.: WO2015/001065
PCT Pub. Date: Jan. 8, 2015

(65) Prior Publication Data
US 2016/0153778 A1    Jun. 2, 2016

(30) Foreign Application Priority Data

Jul. 4, 2013   (GB) .................................. 1312038.1

(51) Int. Cl.
*B62D 15/02*    (2006.01)
*G01B 21/08*    (2006.01)
(Continued)

(52) U.S. Cl.
CPC ......... *G01B 21/08* (2013.01); *B62D 15/0285* (2013.01); *G01B 21/20* (2013.01);
(Continued)

(58) Field of Classification Search
CPC ...... B62D 13/00; B62D 13/06; B62D 15/025; B62D 15/027; B62D 15/0275;
(Continued)

(56) References Cited

U.S. PATENT DOCUMENTS 5,247,442 A    9/1993  Kendall
6,292,094 B1   9/2001  Deng et al.
(Continued)

FOREIGN PATENT DOCUMENTS

DE    10 2006 035021 A1    1/2008
DE    10 2007 032 720 A1    1/2009
(Continued)

OTHER PUBLICATIONS

Combined Search and Examination Report, GB 1312036.5, dated Jan. 22, 2014, 8 pages.
(Continued)

*Primary Examiner* — Richard Goldman
(74) *Attorney, Agent, or Firm* — Myers Bigel, P.A.

(57) ABSTRACT

A trailer parameter identification system (1) for identifying at least one geometrical parameter relating to a trailer (5) comprises at least one sensor (9, 10, 11, 7A, 7B) and a processor (33A, 33B). The at least one sensor (9, 10, 11, 7A, 7B) is configured to acquire data. The processor (33A, 33B) is configured to process said data to generate a value representative of a geometrical parameter of the trailer (5).

14 Claims, 4 Drawing Sheets

(51) Int. Cl.
*G06T 7/60* (2017.01)
*G01B 21/20* (2006.01)
*G01S 19/42* (2010.01)

(52) U.S. Cl.
CPC .............. *G01S 19/42* (2013.01); *G06T 7/60* (2013.01); *G06T 2207/10016* (2013.01); *G06T 2207/30252* (2013.01)

(58) Field of Classification Search
CPC .............. B62D 15/028; B62D 15/0285; B62D 15/029; B60D 1/245; B60C 23/009; B60R 11/04; B05D 1/0808; B05D 1/0891; G06T 2207/30252
USPC ........... 14/159, 166; 380/442, 447; 180/235, 180/411; 340/431; 701/41, 36, 70, 300, 701/96

See application file for complete search history.

(56) References Cited

U.S. PATENT DOCUMENTS

| | | | | |
|---|---|---|---|---|
| 6,854,557 | B1* | 2/2005 | Deng | B62D 7/159 180/235 |
| 7,225,891 | B2* | 6/2007 | Gehring | B62D 13/06 180/14.2 |
| 2004/0130441 | A1* | 7/2004 | Lee | B60D 1/58 340/431 |
| 2005/0055138 | A1* | 3/2005 | Lee | G05D 1/0891 701/1 |
| 2005/0074143 | A1* | 4/2005 | Kawai | B60D 1/36 382/104 |
| 2005/0137784 | A1 | 6/2005 | Grougan et al. | |
| 2005/0209762 | A1* | 9/2005 | Lu | B60T 7/22 701/70 |
| 2005/0270148 | A1* | 12/2005 | Modawell | B60C 23/009 340/445 |
| 2005/0285758 | A1* | 12/2005 | Matsukawa | B60W 10/06 340/932.2 |
| 2006/0020377 | A1* | 1/2006 | Goetz | B60T 17/22 701/32.6 |
| 2006/0111820 | A1 | 5/2006 | Goetting et al. | |
| 2007/0027581 | A1 | 2/2007 | Bauer et al. | |
| 2007/0198190 | A1 | 8/2007 | Bauer et al. | |
| 2008/0095404 | A1 | 4/2008 | Abercrombie et al. | |
| 2008/0312792 | A1 | 12/2008 | Dechamp | |
| 2009/0093928 | A1 | 4/2009 | Getman et al. | |
| 2009/0236825 | A1* | 9/2009 | Okuda | B60D 1/36 280/477 |
| 2009/0243888 | A1 | 10/2009 | Kawabata et al. | |
| 2009/0271078 | A1* | 10/2009 | Dickinson | G06K 9/3241 701/51 |
| 2009/0306854 | A1 | 12/2009 | Dechamp | |
| 2010/0096203 | A1 | 4/2010 | Freese et al. | |
| 2010/0262338 | A1* | 10/2010 | Alguera | B62D 53/0814 701/36 |
| 2012/0271515 | A1 | 10/2012 | Rhode et al. | |
| 2013/0006472 | A1 | 1/2013 | McClain et al. | |
| 2013/0158803 | A1 | 6/2013 | Headley | |
| 2013/0158863 | A1 | 6/2013 | Skvarce et al. | |
| 2014/0005918 | A1 | 1/2014 | Qiang | |
| 2014/0058655 | A1* | 2/2014 | Trombley | B60R 1/00 701/300 |
| 2014/0058668 | A1 | 2/2014 | Trombley et al. | |
| 2014/0222288 | A1 | 8/2014 | Lavoie et al. | |
| 2014/0241584 | A1* | 8/2014 | Elwart | G06K 9/00791 382/104 |
| 2014/0249691 | A1* | 9/2014 | Hafner | B62D 13/06 701/1 |
| 2014/0277942 | A1* | 9/2014 | Kyrtsos | G01L 321/02 701/41 |
| 2014/0297128 | A1* | 10/2014 | Lavoie | G01L 321/06 701/41 |
| 2014/0297129 | A1* | 10/2014 | Lavoie | B62D 13/06 701/41 |
| 2015/0158527 | A1 | 6/2015 | Hafner et al. | |
| 2015/0344010 | A1* | 12/2015 | Kurtovic | B60T 8/1708 701/70 |
| 2016/0129939 | A1 | 5/2016 | Singh et al. | |
| 2016/0152263 | A1 | 6/2016 | Singh et al. | |
| 2016/0153778 | A1* | 6/2016 | Singh | G06T 7/60 701/36 |
| 2017/0029024 | A1 | 2/2017 | Lavoie | |

FOREIGN PATENT DOCUMENTS

| | | |
|---|---|---|
| DE | 10 2011 120814 A1 | 6/2013 |
| EP | 2 011 701 A1 | 1/2009 |
| EP | 2 439 127 A1 | 4/2012 |
| EP | 2 634 071 A1 | 9/2013 |
| FR | 2 926 908 A1 | 7/2009 |
| GB | 2 398 049 A | 8/2004 |
| GB | 2 447 672 A | 9/2008 |
| GB | 2 513 393 A | 10/2014 |
| JP | 2002-326579 A | 11/2002 |
| JP | 2004-058829 A | 2/2004 |
| WO | WO 2012/103193 A1 | 8/2012 |
| WO | WO 2013/086249 A2 | 6/2013 |
| WO | WO 2014/019730 A1 | 2/2014 |

OTHER PUBLICATIONS

Combined Search and Examination Report, GB 1312038.1, dated Jan. 21, 2014, 7 pages.
Combined Search and Examination Report, GB 1312040.7, dated Jan. 22, 2014, 7 pages.
Combined Search and Examination Report, GB 1411930.9, dated Dec. 30, 2014, 8 pages.
Examination Report, GB 1411930.9, dated Nov. 16, 2015, 4 pages.
Fung et al., "Image Processing Application in Toll Collection," IAENG International Journal of Computer Science, 32:4, IJCS_32_4_15, Nov. 12, 2006, 6 pages.
Notification of Transmittal of the International Search Report and the Written Opinion, PCT/EP2014/064253, dated Mar. 3, 2015, 15 pages.
Notification of Transmittal of the International Search Report and the Written Opinion, PCT/EP2014/064270, dated Mar. 3, 2015, 14 pages.
Notification of Transmittal of the International Search Report and the Written Opinion, PCT/EP2014/064268, dated Oct. 9, 2014, 12 pages.
Search and Examination Report, GB 1312036.5, dated Sep. 11, 2014, 6 pages.
Patents Act 1977: Examination Report under Section 18(3), dated Oct. 9, 2017, 4 pp.
Communication pursuant to Article 94(3) EPC, EP Application No. 14 734 516.9, dated Nov. 27, 2017, 7 pp.
Communication pursuant to Article 94(3) EPC, EP Application No. 14 737 197.5, dated Nov. 28, 2017, 7 pp.

* cited by examiner

TRAILER PARAMETER IDENTIFICATION SYSTEM

RELATED APPLICATIONS

This application is a 35 U.S.C. § 371 national stage application of PCT Application No. PCT/EP2014/064268, filed on Jul. 3, 2014, which claims priority from Great Britain Patent Application No. 1312038.1 filed on Jul. 4, 2013, the contents of which are incorporated herein by reference in their entireties. The above-referenced PCT International Application was published in the English language as International Publication No. WO 2015/001065 A1 on Jan. 8, 2015.

TECHNICAL FIELD

The present disclosure relates to a trailer parameter identification system for identifying at least one geometrical parameter relating to a trailer. The present disclosure also relates to a vehicle; to a method; and to a computer program product.

BACKGROUND OF THE INVENTION

It is known to provide a vehicle with parking sensors associated with a park aid system. The parking sensors detect the presence of an obstacle during a parking manoeuvre and the park aid system informs the driver accordingly.

It is known to provide a vehicle with an electronic power assisted steering system (EPAS). The EPAS uses image data acquired from a video camera and/or obstacle proximity data acquired by parking sensors to calculate a parking trajectory and then generates a set of steering control signals to automatically control the vehicle during a parking manoeuvre.

It is known from GB 2447672 to provide an on-board computing unit to acquire image data from three video cameras fitted respectively to the rear of the vehicle and one on each door mirror to track the position of a trailer-mounted marker to determine the position of the trailer relative to the vehicle. The computing unit can also predict a target trailer route to assist the driver with a trailer reversing or parking manoeuvre.

A target trailer route may depend on certain trailer geometrical parameters, such as trailer length, hitch length, axle number and trailer wheelbase. Typically, the driver manually enters in the on-board computing unit the values of any required trailer geometrical parameters, or he can manually select them from a look-up table. The look-up table, in certain instances, contains a list of different types of trailers and the driver is required to manually identify the trailer type from the list. The information entered by the driver could be inaccurate, or incorrect, and this could result into the calculation of an inaccurate, incorrect or at least not ideal target trailer route. The present invention was conceived in order to address this problem.

It is an object of the present invention to reduce, or eliminate, the risk that an inaccurate, incorrect or at least not ideal target trailer route be calculated on the basis of inaccurate or erroneous information entered by the driver on a vehicle computing system configured to calculate a target trailer route.

SUMMARY OF THE INVENTION

Aspects of the present invention relate to a trailer parameter identification system for identifying at least one geometrical parameter relating to a trailer; to a vehicle; to a method; and to a computer program product as claimed in the appended claims.

According to an aspect of the present invention, there is provided a system for identifying at least one geometrical parameter relating to a trailer, the system comprising a processor and at least one sensor for acquiring data relating to the trailer, wherein the processor is configured to process said data to generate a value representative of a geometrical parameter relating to the trailer.

The identification of the at least one geometrical parameter relating to the trailer may thus be performed by the processor on the basis of the data relating to the trailer acquired by the at least one sensor.

The value generated as part of the method is representative of a geometrical parameter relating to the trailer. For example, the value may be: a number indicating distance measured in units of length; or a number indicating an area, a volume, or an angle. This list is not exhaustive and the value may take other forms and be related to other geometrical parameters. For example, the value could be a number indicating the number of wheels on the trailer, or a set of numbers indicating the trailer's shape or profile.

The at least one geometrical parameter can comprise one or more of the following: a tow bar position; a length of the trailer, such as a maximum length of the trailer; a hitch length of the trailer; a rear overhang of the trailer; a width of the trailer, such as a maximum width of the trailer; a height of the trailer, such as a maximum height of the trailer; a height of a trailer undercarriage or chassis; a trailer type or shape; the trailer attitude; the number of wheels; the trailer loading; and the trailer tyre pressure.

The at least one geometrical parameter can comprise the number of axles of the trailer. If the trailer has more than one axle, the wheelbase of the trailer is the distance between the outermost axles.

In some embodiments, the processor is configured to generate a descriptive result related to the trailer. Said descriptive result can be associated with a shape of the trailer, or with a type, class or category of the trailer. Said descriptive result can be a string of alphanumeric characters.

The at least one sensor functions as a data acquisition means. The at least one sensor may comprise a at least one scanning device. The at least one sensor may comprise a sensing means arranged to scan a surface external to the vehicle. The at least one sensor can comprise an imaging sensor, such as a camera; a radar system such as a side scanning radar; a lidar system; a vehicle parking sensor; an ultrasonic transceiver; or a laser scanner. This list, however, is not exhaustive. A combination of different types of sensors can be utilised, for example the at least one sensor can comprise at least one camera and one or more ultrasonic transceivers. The sensors can be configured to acquire data from one or both sides of the vehicle. For example, a sensor can be side facing.

In some embodiments, the trailer parameter identification system is adapted to be installed on-board a vehicle. Said vehicle can, for example, be a car, a van, an SUV (sport utility vehicle), a truck or a bus.

According to another aspect of the present invention there is provided a vehicle comprising a trailer parameter identification system as described herein. Said vehicle can be a trailer towing vehicle.

The vehicle can further comprise a GPS (global positioning system), and the GPS can be configured to cooperate with the trailer parameter identification system in order to associate at least one GPS coordinate to the trailer. If the trailer is parked at a trailer parking location, said GPS coordinate can be a GPS coordinate of the trailer parking location. Said GPS coordinate can be stored and used later to retrieve the parking location of the trailer, if necessary. Alternatively, said GPS coordinate can be a GPS coordinate associated with the location of the vehicle, which location would be an approximation of the trailer location when the vehicle is next to, or close to, the trailer.

The trailer parameter identification system can be in the form of a trailer parameter identification apparatus. The trailer parameter identification apparatus can comprise one or more computational devices, such as said processor.

According to a further aspect of the present invention there is provided a method of identifying at least one geometrical parameter relating to a trailer, the method comprising:
  using at least one sensor, acquiring data relating to the trailer;
  using a processor, processing said data to generate a value representative of a geometrical parameter relating to the trailer.

The at least one sensor and/or the processor can be incorporated into a vehicle. The method can thus further comprise moving the vehicle alongside the trailer. The method can comprise driving the vehicle past the trailer. The distance traveled by the vehicle can be measured, for example by wheel rotation sensors, thereby enabling the processor to generate said geometrical parameter relating to the trailer.

According to a further aspect of the present invention there is provided a computer program product for configuring or reconfiguring a vehicle system having at least one sensor and a processor, the computer program product comprising a computer readable storage medium including computer readable program code, wherein the computer readable program code, when executed on the vehicle system, configures or reconfigures the vehicle system for performing a method as described herein.

The at least one sensor may be configured to automatically commence the acquisition process, for example when a predetermined portion of the trailer is located within a spatial data acquisition domain defined by the at least one sensor, or the data acquisition process may be manually triggered by a user.

The at least one sensor may be configured to acquire a reference data set when the trailer is outside the spatial data acquisition domain. The trailer parameter identification system may thus be configured to be able to identify that the trailer is not located in the spatial data acquisition domain over which the sensor operates. The reference data may be used as the basis of a calibration procedure to train the trailer parameter identification system to automatically detect the trailer, or any given portion thereof, when the trailer is located within the spatial data acquisition domain and commence the data acquisition process.

The sensor may be configured to scan over a direction or over an area. For example the at least one sensor may be mounted on a rotatable shaft actuated by an electric motor.

The trailer parameter identification system may comprise two or more sensors, and said two or more sensors may be configured to cooperate. For example, said two or more sensors may be configured to simultaneously acquire the data relating to the trailer. The two or more sensors can be the same or different from each other.

The method(s) described herein can each be computer-implemented, for example on a computational apparatus comprising one or more microprocessors. According to a yet further aspect of the present invention there is provided a computer program product comprising a computer readable storage medium including computer readable program code, where the computer readable program code when executed on a computer causes the computer to perform the method(s) described herein.

According to an aspect of the present invention, there is provided a trailer parameter identification system for identifying at least one geometrical parameter relating to a trailer, the trailer parameter identification system comprising a processor and one or more sensors for acquiring data relating to the trailer, wherein the processor is configured to process said data to generate a value representative of a geometrical parameter relating to the trailer.

The term processor used herein is to be understood as covering both single processors and multiple processors. For example, the processing steps described herein could be performed by a single processor; or could be performed by separate processors.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF THE DRAWINGS

An embodiment of the present invention will now be described, by way of example only, with reference to the accompanying figures, in which.

DETAILED DESCRIPTION OF AN EMBODIMENT

Figure 1:
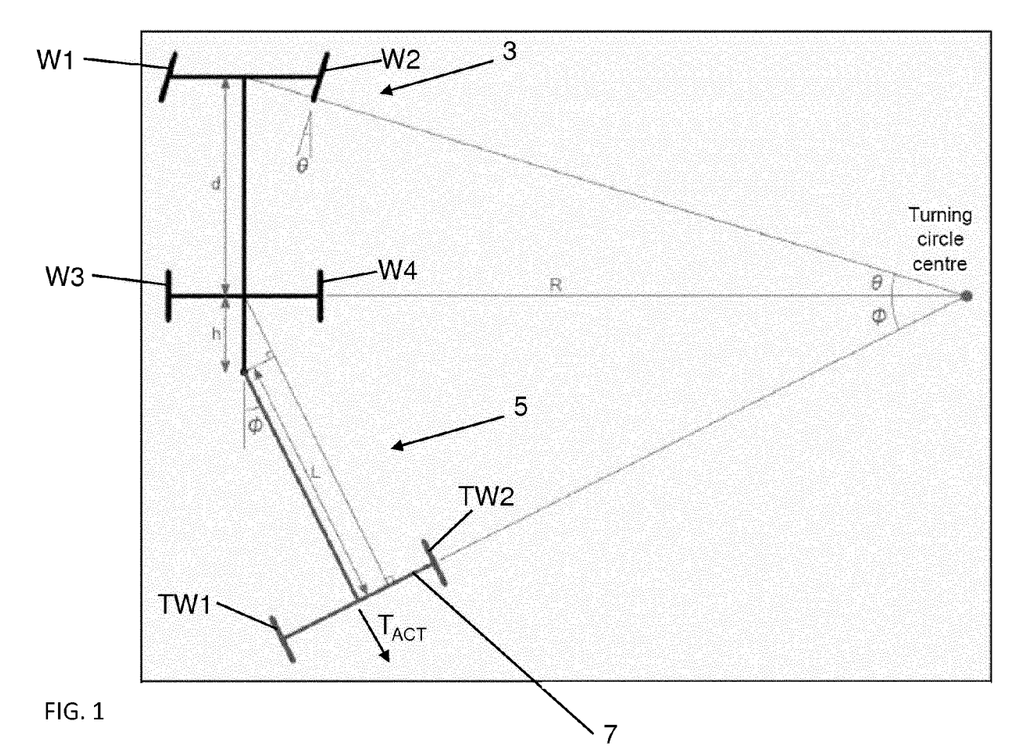
FIG. 1 illustrates schematically a vehicle and a trailer with some associated dimensions, parameters and nomenclature.

FIG. 1 schematically shows a vehicle 3 and a trailer 5 connected thereto (the vehicle 3 and the trailer 5, when coupled, are said to form a 'rig'). The vehicle 3 comprises forward steerable wheels W1, W2 and rear non-steerable wheels W3, W4. The trailer has a single axle 7 arranged between non-steerable trailer wheels TW1 and TW2.

The vehicle 3 is equipped with a trailer parameter identification system 1 for identifying geometrical parameters relating to the trailer 5. The vehicle 3 is also equipped with a vehicle control system (not shown). In the described embodiment, the geometrical parameters identified by the trailer parameter identification system 1 are passed to the vehicle control system to assist the vehicle control system with reversing the vehicle 3 and the trailer 5 into a parking space.

This paragraph explains in more detail the requirement of providing the vehicle control system with information relating to certain geometrical parameters relating to the trailer 5.

As shown in FIG. 1, it is possible to define a hitch angle φ between the vehicle 3 and the trailer 5 according to the following set of equations:

$$R = \frac{d}{\tan(\theta)}$$

$$\phi = \cos^{-1}\left(\frac{-Lh + R\sqrt{R^2 + h^2 - L^2}}{R^2 + h^2}\right) \text{ for positive } \theta$$

$$\phi = -\cos^{-1}\left(\frac{-Lh + R\sqrt{R^2 + h^2 - L^2}}{R^2 + h^2}\right) \text{ for negative } \theta$$

Where: R is the turning radius of the 'rig' (i.e. of the vehicle 3 and trailer 5);
θ the steering angle of the vehicle 3;
d is the wheelbase of the vehicle 3;
h is the tow bar offset of the vehicle 3; and
L is the hitch length of the trailer 5;

The vehicle control system, comprises a trailer guidance module (not shown) which can output a maximum hitch angle signal to indicate the maximum permissible hitch angle $\phi_{MAX}$ for the current steering angle θ. The wheelbase of the vehicle d, the tow bar offset of the vehicle h and the steering angle θ are parameters defined for the vehicle 3. The hitch length L is instead a parameter defined for the trailer 5. Therefore, the vehicle control system requires the driver to input manually a value for the hitch length L. If the driver does not have the required information to hand, the driver may have to take a manual measurement of the hitch length L, e.g. by using a tape measure, and then enter it in an on-board computer unit provided in the vehicle 3 so that the driver can pass the required information to the vehicle control system as part of a manual trailer setup operation. On the basis of the information provided by the driver, the vehicle control system will be able to generate a steering angle control signal and output it to an electronic power assisted steering module (not shown) to control the angle of a steering wheel 47 to provide a required steering angle θ for the front wheels W1, W2. The electronic power assisted module automatically adjusts the angular orientation of the steering wheel 47 to provide the appropriate steering angle θ at the front wheels W1, W2 to control the vehicle 3 and the trailer 5 to match the actual trailer travel direction $T_{ACT}$ with a target trailer travel direction (not shown). The vehicle control system may likewise require inputting of further geometrical parameters relating to the trailer in order to optimise the automatic rig parking manoeuvres, e.g. the trailer length TL and the trailer number of axles.

Figure 2:
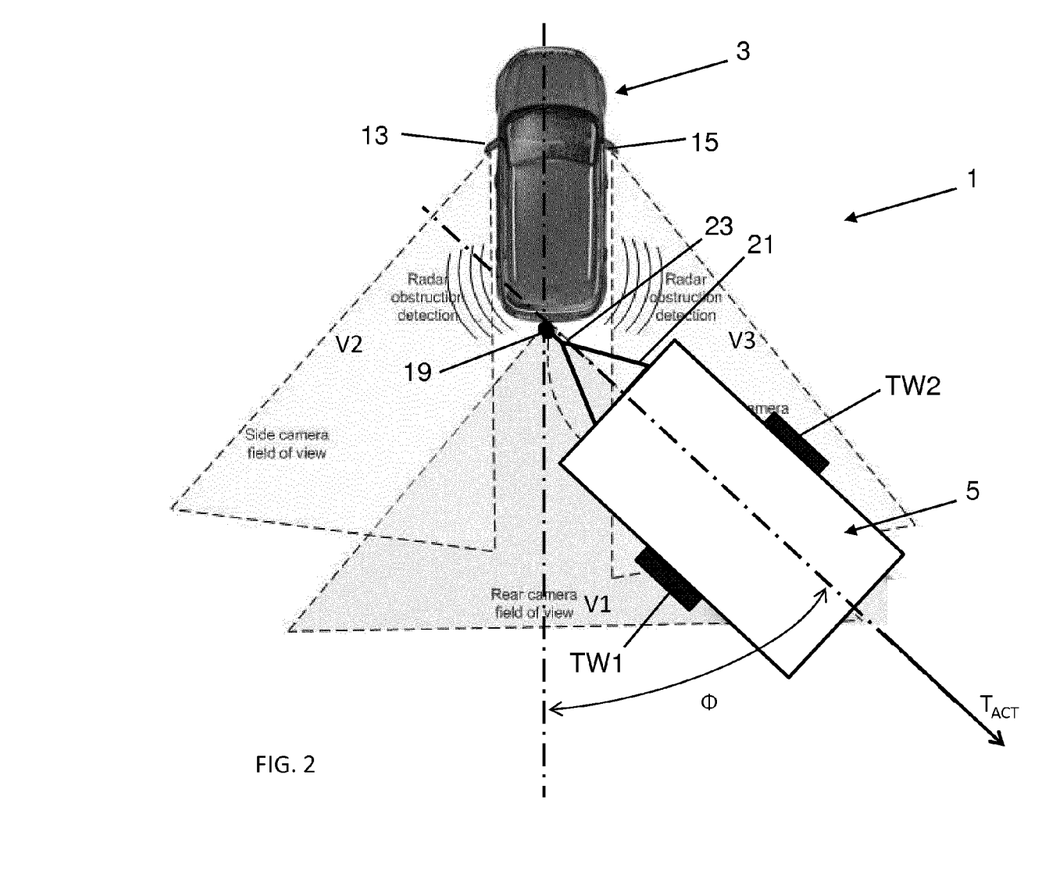
FIG. 2 is a plan view of a trailer coupled to a vehicle incorporating a trailer parameter identification system in accordance with an embodiment of the present invention.
Figure 3:
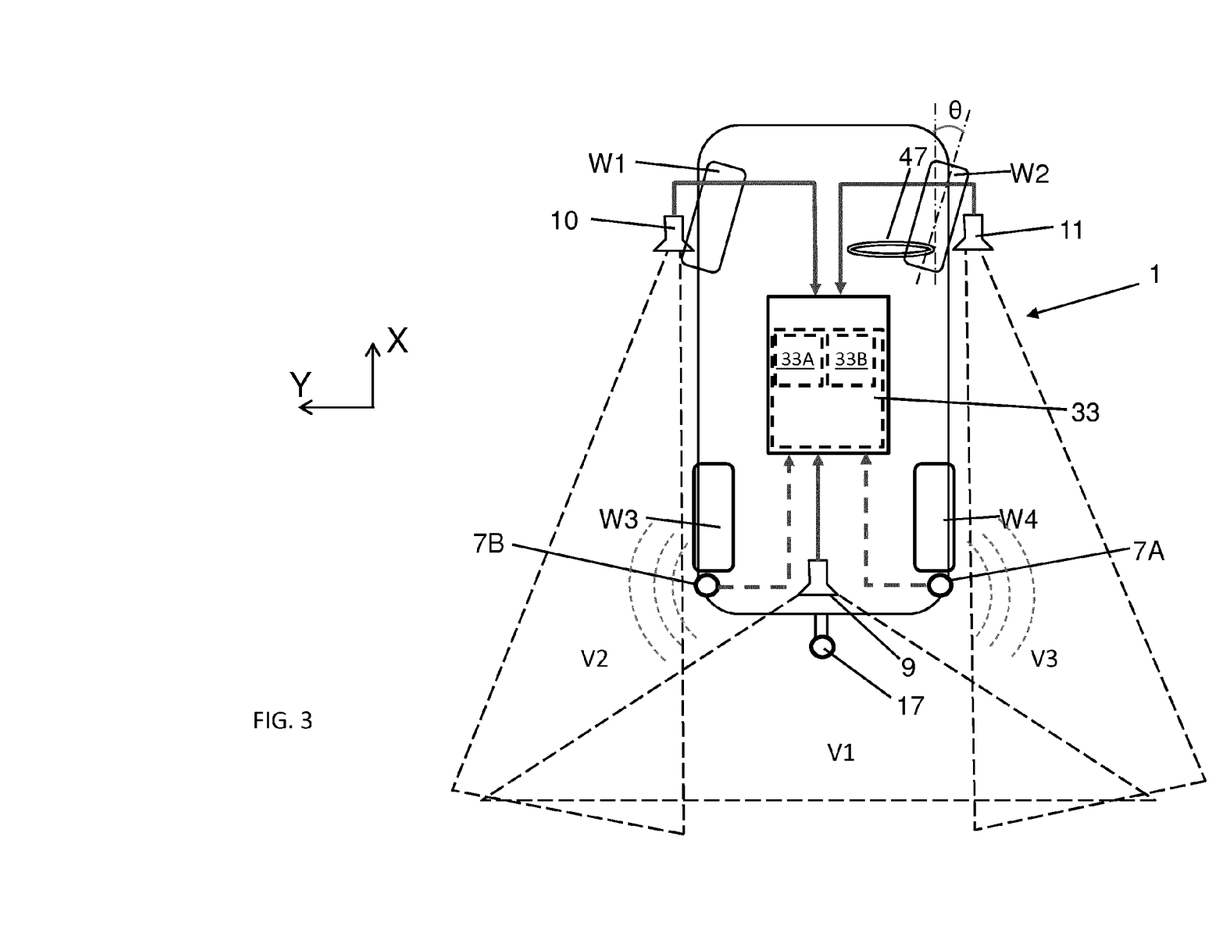
FIG. 3 shows schematically the vehicle and the trailer parameter identification system of FIG. 2.

The trailer parameter identification system 1 described herein comprises: a plurality of sensors in the form of left and right side cameras 10, 11, mounted on respective left and right side mirrors 13, 15 of the vehicle 3; a rear camera 9, mounted on a rear end of the vehicle 3; and left and right radar systems 7B, 7A, mounted on respective left and right sides of the vehicle 3. The cameras 9, 10, 11 and the radars 7A, 7B are in communication with a central processing unit 33 via appropriate data transfer channels (not shown). The central processing unit 33 comprises two processors 33A, 33B configured to process the data acquired by the sensors 7A, 7B, 9, 10, 11.

The vehicle cameras 9, 10, 11 are optical cameras arranged to face to the rear of the vehicle 3. The cameras 9, 10, 11 define respective spatial data acquisition domains in the form of respective fields of view V1, V2, V3 as illustrated by dashed triangles. Similarly, the radar systems 7A, 7B also define respective spatial data acquisition domains (not shown) whose range will depend on the energy emitted by radar emitters (not shown) which are part of the systems 7A, 7B.

It should be noted that in the present embodiment each of the sensors (the cameras 9, 10, 11 and the radar systems 7A, 7B) can be used by the vehicle system for additional and/or alternative purposes, for example the radar systems 7A, 7B can additionally be used as parking sensors, i.e. for detecting the presence of an obstruction in the rear three quarters position of the vehicle 3, and the cameras 9, 10, 11 can additionally be used to provide visual feedback to the driver during an unassisted parking manoeuvre.

A tow hitch 17 is mounted to the vehicle 3 for coupling to a trailer tow coupler 19 mounted to the trailer 5. The tow hitch 17 is an upwardly projecting tow ball in the present embodiment. The trailer tow coupler 19 is mounted to a trailer hitch frame 21 disposed at the front of the trailer 5. The hitch frame 21 is an A-frame having a front apex 23 to which the trailer coupler is mounted.

Figure 4:
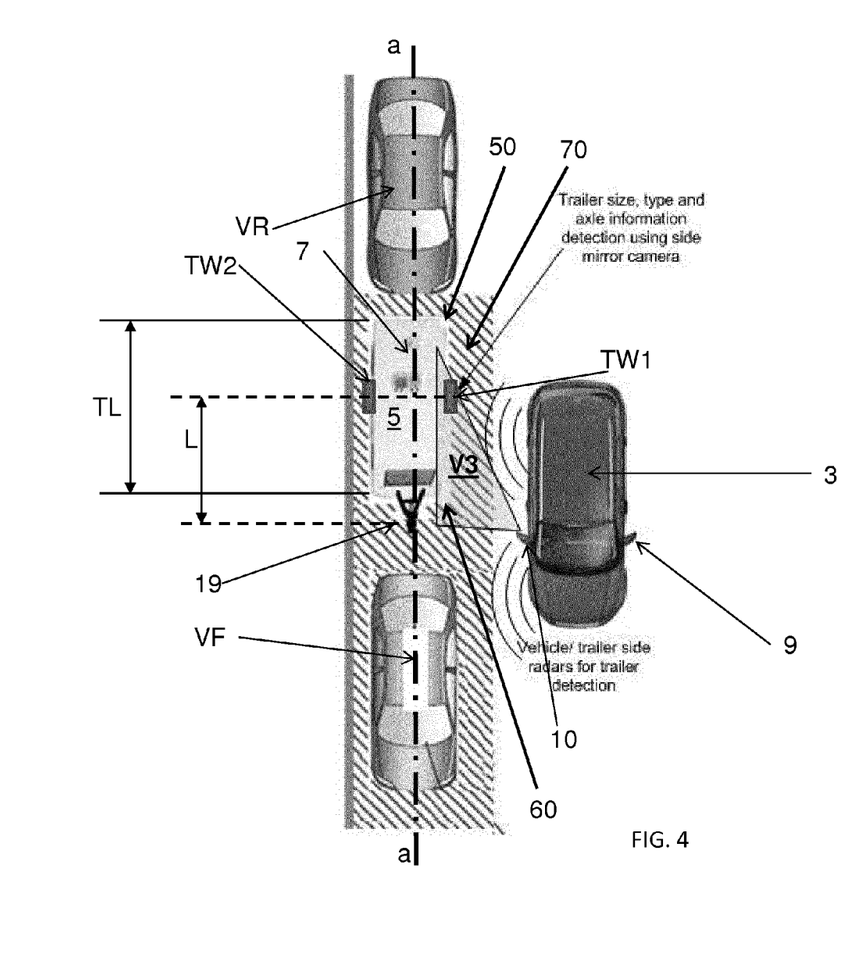
FIG. 4 is a plan view of the vehicle incorporating the trailer parameter identification system of FIG. 2 while performing a trailer parameter identification operation.

The central processing unit 33 comprises a camera processor 33A configured to process the image data acquired from the cameras 9, 10, 11. The vehicle cameras 9, 10, 11 each output image data to the camera processor 33A for analysis. In use, the camera processor 33A analyses the image data from the vehicle cameras 9, 10, 11 to detect and identify the trailer 5 as shown in FIG. 4. Similarly, the central processing unit 33 comprises a radar processor 33B configured to process the radar data acquired by the radar systems 7A, 7B.

The captured image and radar data are processed to generate different sets of post-processed data. In the described embodiment, the image data are processed to retrieve the trailer length TL and the axle number, and the radar data are processed to retrieve the axle number and the trailer hitch length L. The image and radar data are used in combination to determine the trailer type. The captured image and radar data are used to achieve independent estimates of the axle number, one obtained from the data acquired by the cameras and one obtained from the data acquired by the radar systems.

It will be apparent to the skilled person that various identification algorithms, methods or techniques can be used to detect the trailer 5, or any part or portion thereof, when the trailer 5 enters the field of views V1, V2, V3 of any of the cameras 9, 10, 11 or other spatial data acquisition domains pertaining to any other sensors mounted on the vehicle 3. For example, the identification algorithm could specify that a predetermined marker mounted on the trailer 5, e.g. a yellow circle, be identified by the trailer parameter identification system 1. Another possible identification technique is based on sound pulses generated by an ultrasonic probe: when energy is reflected back by the trailer, the probe will have detected the presence of the trailer.

Further, once the trailer or any part thereof has been detected, it will be apparent to the skilled person that various algorithms, methods or techniques can be used to process the acquired data to generate values relating to a geometrical parameter of the trailer.

With reference to FIG. 4, an example of a trailer identification operation carried out using a trailer parameter identification system 1 of the type described above will now be described in detail:

FIG. 4 shows the trailer 5 parked between two vehicles VF, VR. The vehicle 3 is equipped with a trailer parameter identification system 1 and is shown in FIG. 4 while performing a trailer identification manoeuvre to identify three geometrical parameters relating to the trailer 5: the trailer hitch length L, the number of axles of the trailer 5, and the trailer maximum length TL.

As the vehicle 3 approaches the parking bay at which the trailer 5 is parked, a rear end portion 50 of the trailer 5 enters the field of view of the camera 11 mounted on the right hand mirror 15 of the vehicle 3. The camera 11 therefore acquires an image, and the image is sent to the camera processor 33A via a data communication channel (not shown). The camera processor 33A is configured to identify the rear end portion 50 of the trailer 5 and to generate at least one value related to the position of the rear end portion 50 of the trailer 5. In the described embodiment, said value is a reference coordinate of the rear end portion 50 of the trailer 5 along axis a-a shown in FIG. 4. The axis a-a corresponds to a longitudinal axis of the trailer 5.

As the vehicle 3 moves forwards along a trajectory parallel to the axis a-a of FIG. 4, at a certain time a wheel portion 70 of the trailer 5 (i.e. a portion of the trailer associated with the presence in the trailer 5 of a first axle 7) enters the field of view V3 of the camera 11. The camera 11 acquires an image, and the image is sent to the camera processor 33A via the data communication channel. The camera processor 33A is configured to identify said wheel portion 70 and to generate an axle count related to the presence in the trailer 5 of said first axle 7. A similar procedure is repeated for detecting further trailer axles, if present. In the described embodiment, a single axle is detected and counted. The trailer parameter identification system could alternatively be configured to identify a tyre portion of the trailer.

As the vehicle 3 moves forwards, a front end portion 60 of the trailer 5 enters the field of view of the camera 11. The camera processor 33A is configured to identify the front end portion 60 of the trailer 5 and to generate a second value related to the position of the front end 60 of the trailer 5. In the described embodiment, said value represents the coordinate of said front end 60 of the trailer 5 along axis a-a of FIG. 4 relative to the reference coordinate assigned by the camera processor 33A to the rear end portion 50 of the trailer 5. The camera processor 33A is thus also configured to calculate the maximum length TL of the trailer 5 as the difference between the two measured values. In the described embodiment, the trailer length is calculated as about 3 meters.

As the vehicle 3 moves forwards, at a certain time the tow coupler 19 of the trailer 5 enters the data acquisition domain of the right hand radar system 7A. The radar system 7A acquires data and the data are sent to the radar processor 33B via a communication channel (not shown). The radar processor 33B is configured to identify the position of the tow coupler 19 and of the wheel axle 7. The identification is based on reflected electromagnetic energy. The radar processor 33B can thus calculate the hitch length L of the trailer 5. In the described embodiment, the hitch length L of the trailer 5 corresponds to about 2 meters.

The geometrical parameters of the trailer 5 can be determined with reference to the distance traveled by the vehicle 3 as it travels past the trailer 5. The distance traveled by the vehicle 3 between the identified trailer features can be determined by appropriate vehicle measurements, for example the number of rotations (full or partial) of the vehicle wheels W1-W4. Alternatively, or in addition, the distance traveled by the vehicle 3 could be determined based on coordinates derived from an on-board global positioning system (GPS).

The processors 33A and 33B are further configured to optionally cooperate to identify the trailer type. The results obtained by processing the data acquired by the cameras 9, 10, 11 and by the radar systems 7A, 7B are used in the trailer type identification process. In the described embodiment, the trailer parameter identification system 1 has identified the following attribute relating to the trailer 5: the trailer 5 is a trailer for transporting motorcycles. This identification was possible on the basis that the trailer parameter identification system 1 identified a single axle 7, a trailer length TL of about 3 meters, and a hitch length of 2 meters.

A similar procedure would be carried out if the trailer was located on the left hand side of the vehicle, by using the left hand camera 10 and radar system 7B instead of using the right hand camera 9 and radar system 7A. Similarly, the rear view camera 9 can be used to detect and assess a trailer located at the back of the vehicle 3.

An alternate embodiment of the system 1 utilises a combination of a side view camera and one or more side ultrasonic sensors disposed on each side of the vehicle 3. When activated, the side ultrasonic sensors can identify the location of the back of the trailer 5. The system 1 can be configured to implement a shape recognition algorithm to identify a trailer wheel TW1, TW2 in an image data set derived from the side view camera. The system 1 can also determine the maximum height of the trailer 5 based on said image data set. If no further trailer wheels TW1, TW2 are identified using the side camera, the system 1 can use the side ultrasonic sensor(s) to detect the front of the trailer body. The side camera can then be used to identify the tow hitch 17. The system could be configured to reverse the procedure to allow the trailer features to be identified as the vehicle 3 travels from the front to the rear of the trailer 5. The system 1 could, for example, utilise said shape recognition algorithm automatically to identify the front and rear of the trailer 5, for example by detecting the presence/absence of the tow hitch 17 or the hitch frame 21. Alternatively, the driver of the vehicle 3 could indicate the direction in which they are travelling in relation to the trailer 5. This embodiment could be developed to measure the posture (attitude) of the trailer and/or the ride height of the trailer, for example to determine loading of the trailer to identify any possible imbalance and tyre pressure issues. The implementation of a suitable shape recognition algorithm would allow the side view camera to be used without the side ultrasonic sensors.

It will be apparent to the skilled person that many variations of the invention are possible, within the scope of the appended claims.

Further aspects of the present invention are set out in the following numbered paragraphs:

1. A system for identifying at least one geometrical parameter relating to a trailer, the system comprising a processor and at least one sensor for acquiring data relating to the trailer, wherein the processor is configured to process said data to generate a value representative of a geometrical parameter relating to the trailer.

2. A system according to paragraph 1, wherein said at least one geometrical parameter comprises one or more of the following:

a tow bar position;
a maximum length of the trailer;
a hitch length of the trailer;
a rear overhang of the trailer;
trailer shape;
number of wheels;
trailer loading; and
trailer tyre pressures.

3. A system according to paragraph 1 or paragraph 2, wherein said at least one geometrical parameter comprises the number of axles of the trailer.

4. A system according to any one of paragraphs 1, 2 or 3, wherein said at least one geometrical parameter comprises a height of the trailer.

5. A system according to any one of the previous paragraphs, wherein the processor is further configured to process said data to generate a descriptive result related to the trailer.

6. A system according to paragraph 5, wherein said descriptive result is associated with a shape of the trailer.

7. A system according to paragraph 5, wherein said descriptive result is associated with a type, class or category of the trailer.

8. A system according to any one of the previous paragraphs, wherein the at least one sensor is: a camera; a radar; a vehicle parking sensor; an ultrasonic transceiver; or a laser scanner.

9. A system according to one of the previous paragraphs, wherein said trailer parameter identification system is adapted to be installed on-board a vehicle.

10. A vehicle comprising a system according to paragraph 9.

11. A vehicle according to paragraph 10, further comprising a GPS system configured to cooperate with the system in order to associate at least one GPS coordinate to the trailer.

12. A method of identifying at least one geometrical parameter relating to a trailer, the method comprising:
   acquiring data relating to the trailer;
   processing said data to generate a value representative of a geometrical parameter relating to the trailer.

13. A method according to paragraph 12, wherein the at least one sensor is incorporated into a vehicle.

14. A method according to paragraph 13, further comprising moving the vehicle alongside the trailer.

15. A computer program product for configuring or reconfiguring a vehicle system having a at least one sensor and a processor, the computer program product comprising a computer readable storage medium including computer readable program code, wherein the computer readable program code, when executed on the vehicle system, configures or reconfigures the vehicle system for performing a method according to any one of paragraphs 12, 13 or 14.

The invention claimed is:

1. A system for identifying at least one geometrical parameter of a trailer, the system being adapted to be installed on-board a vehicle, the system comprising:
   a processor; and
   at least one sensor for acquiring data relating to the trailer as the vehicle drives past the trailer and arranged to send the data to the processor,
   wherein the processor is configured to process the data to generate a value representative of the at least one geometrical parameter of the trailer, the at least one geometrical parameter comprising a hitch length of the trailer between the tow coupler and the wheel axle;
   wherein the processor is configured to generate the at least one geometrical parameter with reference to a distance traveled by the vehicle as it travels past the trailer.

2. The system of claim 1, wherein the at least one geometrical parameter comprises one or more of the following:
   a tow bar position;
   a maximum length of the trailer;
   a rear overhang of the trailer;
   trailer shape; and
   number of wheels.

3. The system of claim 1, wherein the at least one geometrical parameter comprises a number of axles of the trailer.

4. The system of claim 1, wherein the processor is configured to process the data to generate a descriptive result related to the trailer.

5. The system of claim 4, wherein the descriptive result is associated with a shape of the trailer.

6. The system of claim 4, wherein the descriptive result is associated with a type, class or category of the trailer.

7. The system of claim 1, wherein the at least one sensor is: a camera, a radar, a vehicle parking sensor, an ultrasonic transceiver, or a laser scanner.

8. A vehicle comprising the system of claim 1.

9. The vehicle of claim 8, further comprising a GPS (global positioning system) configured to cooperate with the system in order to associate at least one GPS coordinate to the trailer.

10. The system of claim 1, wherein the at least one sensor is configured to acquire data from one or both sides of the vehicle.

11. A method of identifying at least one geometrical parameter of a trailer, the method comprising:
   acquiring data relating to the trailer via at least one sensor incorporated into a vehicle, the data being acquired as the vehicle drives past the trailer; and
   processing the data to generate a value representative of a geometrical parameter of the trailer comprising a hitch length of the trailer between the tow coupler and the wheel axle, wherein the at least one geometrical parameter is generated with reference to a distance travelled by the vehicle as it travels past the trailer.

12. A computer program product for configuring or reconfiguring a vehicle system having at least one sensor and a processor, the computer program product comprising a non-transitory computer readable storage medium including computer readable program code, wherein the computer readable program code, when executed on the vehicle system, configures or reconfigures the vehicle system for performing the method of claim 11.

13. The method of claim 11, wherein the at least one geometrical parameter comprises one or more of the following:
   a tow bar position;
   a maximum length of the trailer;
   a hitch length of the trailer;
   a rear overhang of the trailer;
   trailer shape;
   number of wheels;
   trailer loading; and
   trailer tire pressures.

14. A trailer parameter identification apparatus configured to carry out the method of identifying at least one geometrical parameter of a trailer according to claim 11.

* * * * *

UNITED STATES PATENT AND TRADEMARK OFFICE
CERTIFICATE OF CORRECTION

PATENT NO. : 10,119,812 B2
APPLICATION NO. : 14/900778
DATED : November 6, 2018
INVENTOR(S) : Singh et al.

Page 1 of 1

It is certified that error appears in the above-identified patent and that said Letters Patent is hereby corrected as shown below:

In the Claims

Column 10, Lines 48-58, Claim 13: Please delete claim 13 in its entirety and replace with the following:

The method of claim 11, wherein the at least one geometrical parameter comprises one or more of the following:
    a tow bar position;
    a maximum length of the trailer;
    a rear overhang of the trailer;
    trailer shape; and
    number of wheels.

Signed and Sealed this
Second Day of April, 2019

Andrei Iancu
*Director of the United States Patent and Trademark Office*